United States Patent [19]
Fillmore

[11] 3,913,006
[45] Oct. 14, 1975

[54] VOLTAGE REGULATOR CIRCUIT WITH RELATIVELY LOW POWER CONSUMPTION

[75] Inventor: Richard Plumb Fillmore, Plainfield, N.J.

[73] Assignee: RCA Corporation, New York, N.Y.

[22] Filed: May 20, 1974

[21] Appl. No.: 471,553

[52] U.S. Cl. ............... 323/17; 58/23 A; 58/50 R; 320/1; 321/2
[51] Int. Cl.² .................. H02P 13/18; G04C 3/00
[58] Field of Search ............ 323/17, DIG. 1; 321/2, 321/18; 320/1; 58/23 R, 23 A, 23 BA, 50 R

[56] References Cited
UNITED STATES PATENTS

| | | | |
|---|---|---|---|
| 3,619,758 | 11/1971 | Deranian | 321/2 R |
| 3,803,517 | 4/1974 | Bellocchio | 321/2 X |
| 3,818,306 | 6/1974 | Marini | 323/17 |
| 3,835,368 | 9/1974 | Williams | 323/17 |
| 3,842,589 | 10/1974 | Luce et al. | 58/50 R |

*Primary Examiner*—Gerald Goldberg
*Attorney, Agent, or Firm*—H. Christoffersen; S. Cohen

[57] ABSTRACT

A circuit for regulating the voltage across a capacitor which is charged by a pulse driven voltage converter. In the present circuit the voltage across the capacitor is sampled during each pulse period. The width of the pulse employed to drive the converter is then adjusted in response to this voltage to the lowest value required to replace the charge lost by the capacitor since the preceding pulse.

11 Claims, 5 Drawing Figures

VOLTAGE REGULATOR CIRCUIT WITH RELATIVELY LOW POWER CONSUMPTION

In small electronic instruments such as electronic wristwatches it is important that power consumption be minimized to extend battery life.

In the circuit of the present application a charge storage means supplies the voltage employed to operate certain circuits of the electronic instrument. The charge storage means is charged from a charge supply circuit such as an inductor to which energy is applied during spaced time intervals. Power consumption is reduced by sensing the voltage across the charge storage means and in response thereto controlling the amount of energy supplied to the charge supply circuit by, for example, controlling the duration of the spaced time intervals during which such energy is supplied.

The invention is discussed in greater detail below and is illustrated in the drawing of which:

Figure 1:
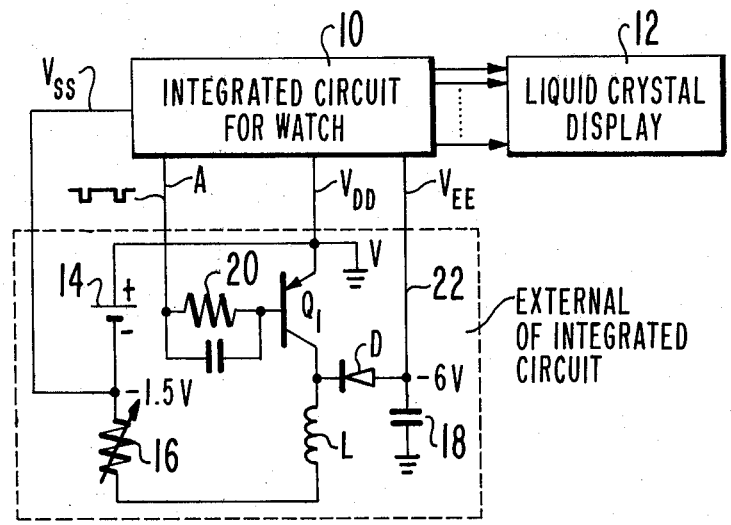
FIG. 1 is a block and circuit diagram of a known electronic wristwatch.

The electronic watch illustrated in FIG. 1 includes an integrated circuit 10 which drives a display 12. The integrated circuit may be on a single monolithic substrate (chip) and, for example, may be type TA 6478 or may be one of several commercially available circuits on two or more chips. The liquid crystal display 12 may comprise a number of numeric indicators and may also include punctuation marks such as periods or colons and letters. The liquid crystal may be of the dynamic scattering or field effect type, as examples. The circuits and displays are commercially available from RCA Corporation and some are available from other manufacturers.

In more detail, the integrated circuit 10 includes a crystal oscillator such as one operating at 32.768 Khz. The oscillator drives a frequency divider which is operated at a relatively low voltage such as $-1.5$ volts. The voltage divider output is applied through a level shifter to a second frequency divider, this one operated at a higher voltage such as $-6$ volts. The frequency divider drives a counter and the counter outputs are decoded to select the segments of the display to be excited. The voltage divider also provides a low frequency unipolarity voltage for driving the liquid crystal display. This may be at a frequency of 64 Hz. or 32 Hz. or some other suitable low frequency. All of these circuits are in themselves well known.

The power supply for the integrated circuit display is external of the integrated circuit. It includes a small battery 14 such as a single cell, silver oxide battery. The battery may be grounded at its positive terminal and the negative terminal provides the $-1.5$ volts necessary for operating certain of the circuits of integrated circuit 10.

The battery serves as the primary power source for the voltage converter shown. The latter includes a PNP transistor $Q_1$ connected at its emitter electrode to ground and at its collector electrode to the cathode of diode D and to one terminal of inductor L. The other terminal of the inductor is connected through a variable trim resistor 16 to the negative terminal of battery 14. The anode of the diode D is connected to one plate of capacitor 18, the other plate of this capacitor being connected to ground. Pulses A of 30 microsecond duration and at a pulse repetition frequency of 256 Hz. are applied from the integrated circuit 10 through the resistor-capacitor coupling network 20 to the base of transistor $Q_1$. These pulses are obtained from one of the stages of the low voltage divider circuit and are shaped by suitable logic gates. (It is to be understood that the pulse width and frequency are given by way of example only as other widths and pulse repetition frequencies may be used instead.)

In the operation of the voltage converter of FIG. 1, during the periods between pulses A the base electrode of transistor $Q_1$ is at ground so that this transistor is cut off. Each time a negative pulse occurs (this pulse being at an amplitude of $-1.5$ volts), transistor $Q_1$ is driven into conduction. Current then flows through the inductor L and a magnetic field develops around the inductor. Upon the termination of the negative pulse A, the magnetic field around the inductor attempts to collapse. The capacitor 18 then supplies energy to the inductor through the diode D, the capacitor 18 becoming charged negatively in the process.

In the present design the circuit parameters, that is, the values of the primary voltage source 14, capacitor 18, inductor L and resistor 16, are chosen to cause $-6$ volts to develop at line 22. This is the voltage $V_{EE}$ employed to power certain of the circuits in the integrated circuit 10. In other designs with other values of circuit parameters, other voltages such as $-10$ volts or $-15$ volts or more, or corresponding positive values of voltage, may be obtained instead.

In the circuit of FIG. 1, the duration of the pulse applied to the base electrode of transistor $Q_1$ is constant at 30 microseconds. However, the value of the high voltage $V_{EE}$ which develops across capacitor 18 is not constant but rather depends upon the number of segments in the display being driven (that is, the size of the load) and this varies in accordance with the numbers being displayed. It also changes as a function of the voltage provided by battery 14, and also depends upon other factors.

A problem to be considered in the design of the circuit of FIG. 1 is that of possible damage to the integrated circuits. In one design, the high voltage must not be permitted to exceed 7 to 9 volts or a voltage breakdown within the chip may occur.

It is also important in the circuit design to reduce power consumption, that is, to minimize the drain on the battery. In other words, the voltage at lead 22 must be adjusted to the minimal value possible to obtain desired operation of the integrated circuit over some reasonable period of time.

In the design shown in FIG. 1, a value of $-6$ volts is reasonably consistent with the various requirements above. However, the circuit now becomes relatively sensitive to battery voltage. For example, if the battery voltage initially is $-1.6$ volts and drops to $-1.4$ volts, then $V_{EE}$ drops from $-6.0$ volts to $-4.0$ volts. While adjustment of resistor 16 will compensate, to a certain extent, for aging of the battery, in general it is not practical to permit the consumer to make this adjustment as damage to the instrument could result. In the case of a wristwatch, for example, resistor 16 is within the case and very small and not easily accessible. Moreover, in the circuit of FIG. 1, regardless of the amount of charge dissipated by capacitor 18 from one pulse A to the next, the same amount of energy is employed to power the inductor each period. That portion of the energy in excess of what is actually needed to replace the charge lost by the capacitor since the preceding period is wasted power and needlessly drains the battery — lessens its life.

The circuit of the present application solves the various problems above by sensing the voltage across the capacitor 18 and in response thereto, controlling the duration of the pulses applied to the base electrode of transistor $Q_1$. The circuit is inserted in series with the lead going to the base electrode of transistor $Q_1$ and is shown largely within the dashed block 30 of FIG. 2. The entire circuit within the dashed block may be integrated and, in practice, is located on the same semiconductor substrate (or one of the substrates) making up the integrated circuit 10 shown in FIG. 1.

Figure 2:
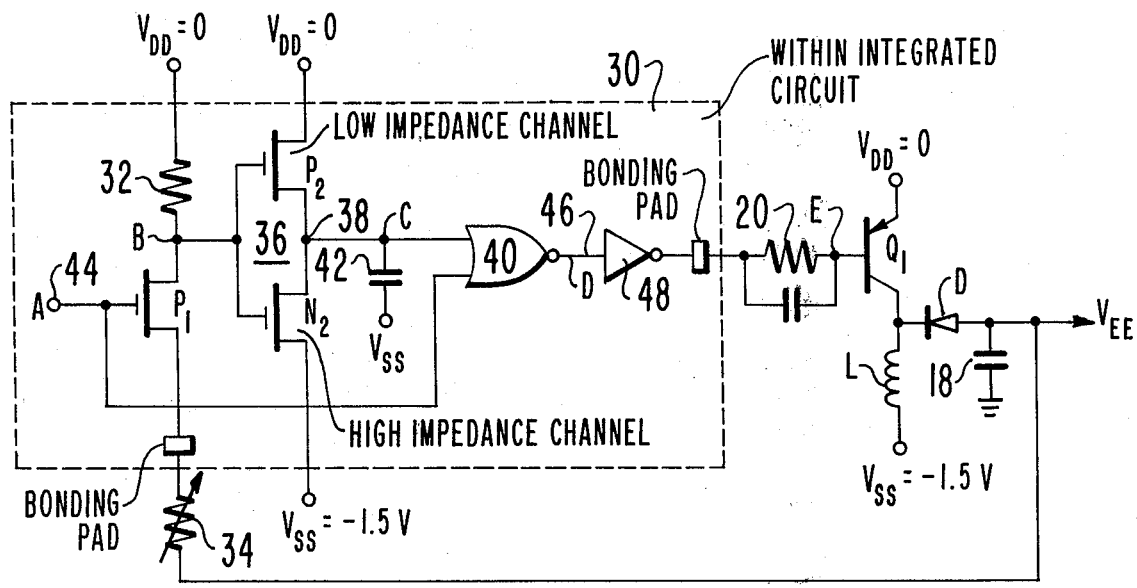
FIG. 2 is a circuit diagram of a preferred embodiment of the present invention.

The circuit of FIG. 2 includes a P type MOS transistor $P_1$ connected at its source electrode through resistor 32 to ground and at its drain electrode through variable trim resistor 34 to the $V_{EE}$ terminal. The presence of trim resistor 34 makes resistor 16 of FIG. 1 unnecessary and it is omitted from the circuit of FIG. 2. Resistor 32 may be a diffused resistor and may have a value in the range of 100–200 kilohms. The precise value of this resistor is not important in view of the presence of variable trim resistor 34. It is adjustable in the range of 1 to 2 megohms to provide, when transistor $P_1$ is conducting, a 10 to 1 or so voltage divider with resistor 32.

The source electrode of transistor $P_1$ is connected to the input terminal of inverter 36. This inverter is a complementary-symmetry, metal-oxide-semiconductor (COS/MOS) inverter and includes P type transistor $P_2$ and N type transistor $N_2$. The interconnected gate electrodes of these transistors serve as the input terminal of the inverter and the interconnected drain electrodes as the output terminal. The source electrode of transistor $P_2$ is connected to the $V_{DD}$ terminal (ground) and the source electrode of transistor $N_2$ is connected to the $V_{SS}$ terminal (−1.5 volts).

The output terminal 38 of inverter 36 connects to one input terminal of NOR gate 40 and to one terminal of capacitor 42. The latter is an integrated circuit capacitor of roughly two picofarads value and is connected at its other terminal to the VSS terminal (−1.5 volts). (In practice, this capacitor may be a MOS capacitor comprising a gate electrode separated by a thin silicon dioxide layer from a diffusion in the substrate, as one example). The second input terminal to NOR gate 40 connects to the circuit input terminal 44 and receives the negative pulses A. Output terminal 46 of the NOR gate connects through inverter 48 and through the resistor-capacitor coupling network 20 to the base electrode of transistor $Q_1$. The remainder of the circuit is as shown in FIG. 1 except for resistor 16 which, as already mentioned, is not needed.

Figure 3:
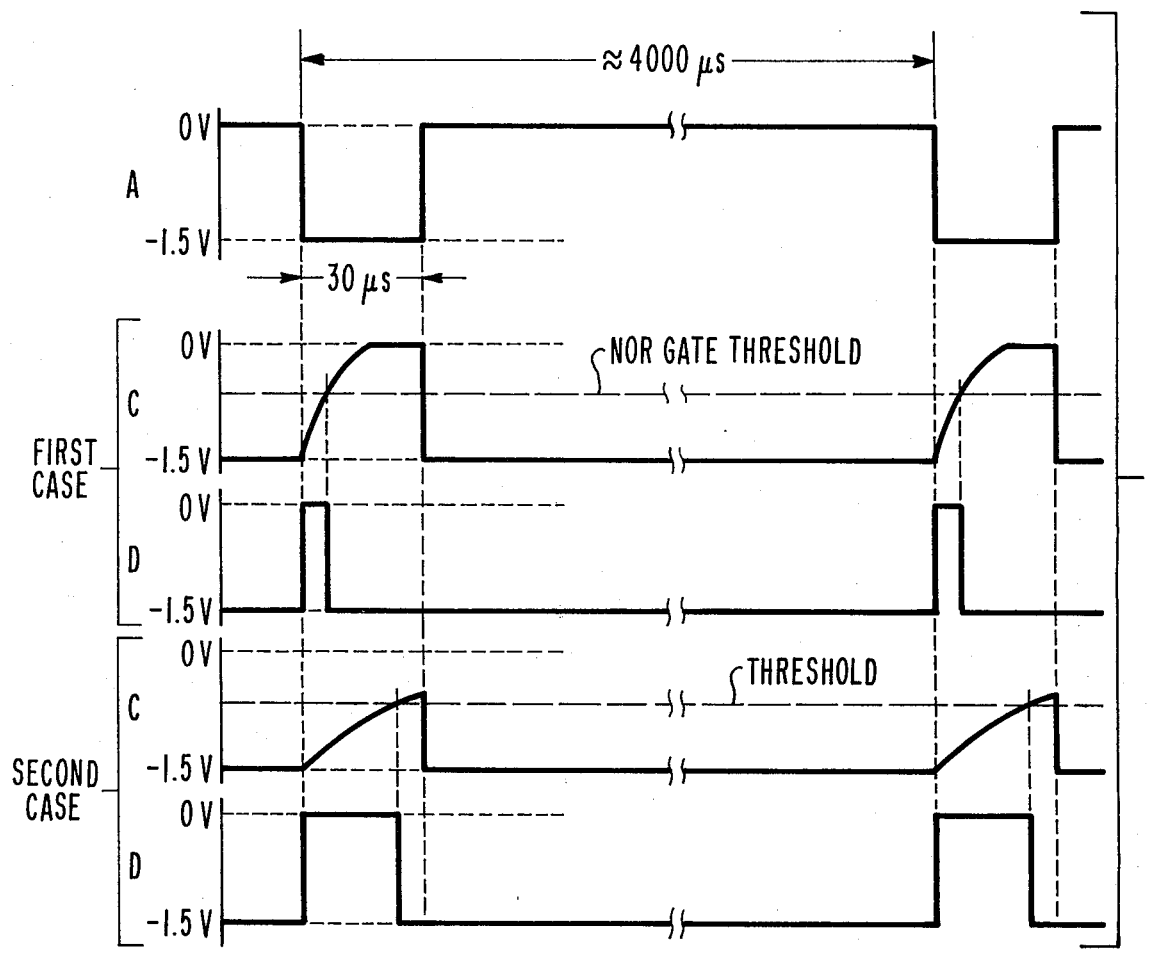
FIG. 3 is a drawing of waveforms to help explain the operation of the circuit of FIG. 2.

In the explanation which follows of the operation of the circuit of FIG. 2, both FIGS. 2 and 3 should be referred to. In the absence of pulse A, transistor $P_1$ is cut off. The voltage B present at the source electrode is zero volts. This relatively "high" voltage level can be thought of as representing a binary 1. This voltage turns off transistor $P_2$ of the inverter and turns on transistor $N_2$ of the inverter. Transistor $N_2$ conducts so that C, the voltage present at the output terminal of the inverter 36, is −1.5 volts (a "low" representing binary zero). Capacitor 42 therefore is quiescently uncharged as both of its terminals are at −1.5 volts. The other input terminal of the NOR gate is at a high level so that NOR gate 40 is disabled and output terminal 46 is at −1.5 volts. The inverter 48 translates this binary zero level to a binary 1 level, that is, to ground level, so that transistor $Q_1$ is cut off.

When A goes low, transistor $P_1$ is driven into conduction. Also, as C initially is low (at −1.5 volts), NOR gate 40 is enabled and D goes high (to ground).

When A goes low and transistor $P_1$ is driven into conduction, a divided down sample of the voltage $V_{EE}$ appears at B. Assuming that resistor 34 is ten times as large as resistor 32, one eleventh of the voltage of $V_{EE}$ appears at point B. The voltage at B, in other words, may be in the range of zero to almost −0.6 volt.

The inverter 36 is designed so that the impedance of the conduction channel of transistor $P_2$ is much, much lower than that of the transistor $N_2$. Thus, only this relatively small value of voltage is needed to cause transistor $P_2$ to start to conduct. If the voltage $V_{EE}$ across capacitor 18 is say at close to −6 volts, the fraction of the voltage sampled at B will be sufficient to turn on transistor $P_2$ relatively hard. In other words, the conduction path impedance of transistor $P_2$ will be changed to a relatively low value. This conduction path serves as a charge path for capacitor 42. Initially this capacitor is discharged (−1.5 volts at both of its terminals). When transistor $P_2$ is turned on, the capacitor charges to ground.

The charge curve is illustrated at C (first case) in FIG. 3. As the charge is very rapid for the case in which $V_{EE}$ is close to −6 volts, the voltage C, within a very short interval of time, reaches the NOR gate threshold level. When this occurs, the NOR gate output D switches from a high (zero volts representing binary 1) to a low (−1.5 volts representing binary zero). Inverter 48 converts the positive pulse to a negative pulse E (not shown in FIG. 3) of the same duration, and this negative pulse is applied to the base electrode of transistor $Q_1$ and turns on transistor $Q_1$.

Note that pulse D (and therefore pulse E) is much shorter than 30 microseconds. Thus, the energy employed to charge the inductor L is relatively much less than it would be with the circuit of FIG. 1 where the transistor $Q_1$ is turned on for the entire 30 microseconds in response to each A pulse. The circuit parameters are so chosen that the pulse E width and therefore the energy supplied to the inductor is just sufficient to make up any charge which has been lost by capacitor 18, since the immediately preceding pulse E. In other words, if the voltage across capacitor 18 has dropped from −6.0 volts to −5.9 volts since the last pulse E, the energy supplied to inductor L is just sufficient to cause it to increase the voltage across capacitor 18 by 0.1 volt.

In the case in which the capacitor 18 has discharged substantially between pulses A, the voltage sampled at point B during the pulse A will be relatively low. For example, if the capacitor 18 is discharged say to −4 volts since the preceding pulse, then the voltage sampled at B will be less than 0.4 volt (assuming 10:1 resistance ratio of 34, 32). The result is to turn on transistor $P_2$ but at a relatively lower conduction level, that is, at a relatively higher impedance level. This increases the charge time for capacitor C as illustrated in "second case" in FIG. 3. At this higher impedance level it takes a considerable longer portion of the 30 microseconds duration of pulse A for the voltage C to reach the threshold voltage of the NOR gate. The result is that the pulse supplied to the base electrode of transistor $Q_1$ is longer and the amount of time during which energy is applied through transistor $Q_1$ to inductor L is also longer. This, in turn, means that upon termination of this pulse E, the inductor L will supply more charge to capacitor 18, sufficiently so to increase the voltage across capacitor 18 from $-4$ volts to $-6$ volts.

An important advantage of the circuit of the present application is that the amount of power required to regulate the voltage across capacitor 18 is minimized. For example, if capacitor 18 is not discharged at all since the preceding pulse then, at the limit, transistor $Q_1$ will not be turned on at all and there will be no drain on the battery at all. In any case, the battery drain is only of the amount of power required to maintain the output voltage at the desired value.

Another advantage is that because of the sampled nature of the voltage sensing, relatively low resistivity sampling resistors (32 and 34) may be used without substantially adversely affecting power consumption. (This means less area on the integrated circuit for resistor 32.) (Note that the duty cycle (30 microseconds out of roughly 4000 microseconds) is roughly 0.75% so that little power is consumed in obtaining the sample at B.)

A final advantage of the circuit is that the regulated output voltage is insensitive to variations in the parameters of the circuits being driven such as the gain of the transistors of the integrated circuit. It is also relatively insensitive to the battery voltage. For example, resistor 32 may be a diffused resistor and as contrasted to an MOS resistor, is not voltage dependent.

The switching threshold of the usual COS/MOS inverter which has N and P devices of equal conductivity is approximately 50% of the supply voltage. In this case, at a battery voltage of $-1.6$ volts, the switching threshold is approximately $-0.8$ volt. A decrease in battery voltage to $-1.4$ volts, for example, would means the switching threshold would change to $-0.7$ volt. Assuming a fixed input voltage at B, a change in switching threshold of inverter 36 would result in Capacitor C charging faster and a narrower pulse at E. The circuit would then find a stable output voltage at 18 which was lower than that originally preset by resistor 34.

In contrast to the above, the inverter 36 has a large P channel and small N channel. By virtue of this geometry, its switching threshold is skewed, that is, it is close to the P transistor threshold voltage and it can be shown that this makes it relatively less sensitive to variations in the battery 14 voltage. For example, it can be shown that whereas in the case of a balanced inverter, a change in $V_{DD}$-$V_{SS}$ from 1.6 to 1.4 volts results in a change in the voltage threshold $\Delta V_T$ of the inverter from 0.8 to 0.7 volt $= 0.1$ volt, for the same change in an unbalanced inverter 36 of the particular design, $\Delta V_T = 0.04$. Making $\Delta T$ less sensitive to variations in $V_{DD}$-$V_{SS}$, of course, improves the performance of the circuit as the width of pulse E becomes less sensitive to variations in $V_{DD}$-$V_{SS}$.

Figure 4:
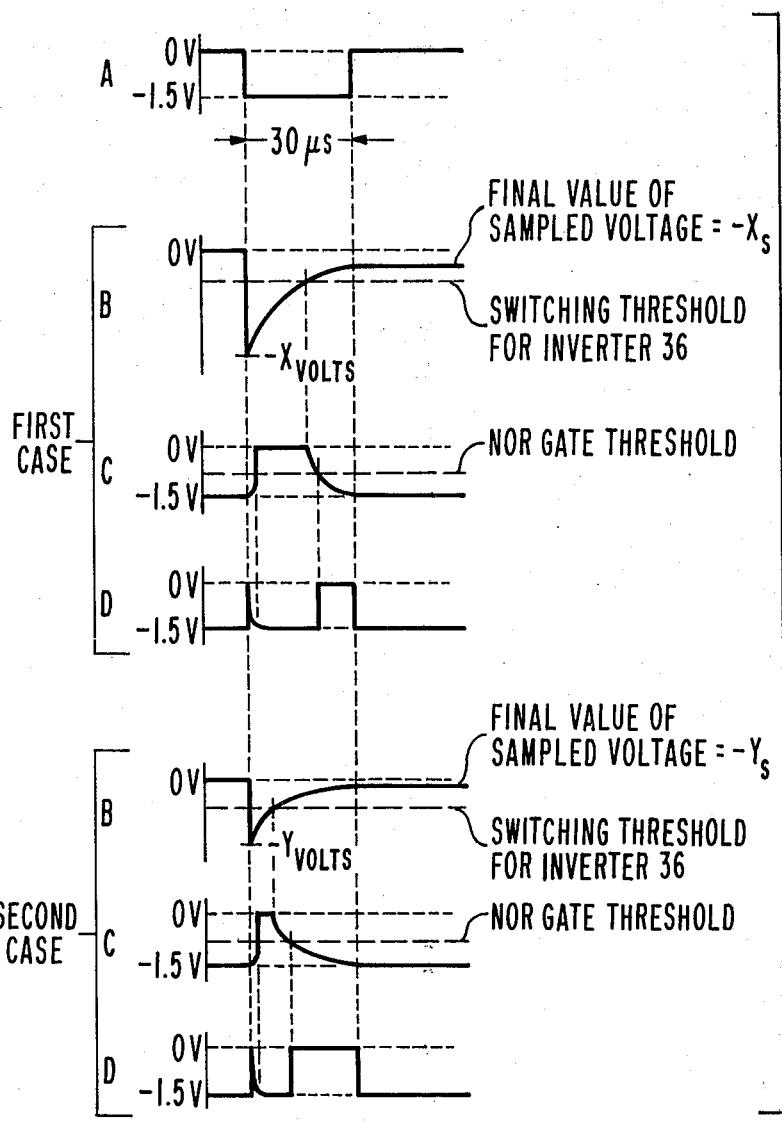
FIG. 4 is a drawing of waveforms to explain an anomalous mode of operation of the circuit of FIG. 2.

The operation of the circuit of FIG. 2 discussed above has assumed that the distributed capacitance at certain points in the circuit is so low that it may be ignored. It has been found, however, that when the distributed capacitance across resistor 34 is sufficiently high, it results in an anomalous mode of operation, as illustrated in FIG. 4. The circuit still provides pulses of the desired duration to transistor $Q_1$ but in a different way than described above.

FIGS. 2 and 4 should be referred to in the discussion which follows. When A goes low to $-1.5$ volts, transistor $P_1$ goes on. However, rather than point B going to the sampling voltage level, which may be less than a volt, it will overshoot if there is sufficient distributed capacitance across resistor 34. It overshoots toward the value of $V_{EE}$. This relatively high voltage turns on transistor $P_2$ very hard, and capacitor C charges toward $V_{DD}$ very rapidly. In an extremely short time the voltage at C reaches the threshold of NOR gate 40. For the brief period that the signal C is lower than the threshold, NOR gate 40 is enabled, and a relatively positive spike occurs at D. While this may result in transistor $Q_1$ turning on momentarily, the spike is so short that it may be ignored for purposes of the present explanation.

As mentioned above, point B initially overshoots to some value, call it $-X$ volts, which is proportional to the value of $V_{EE}$. The distributed capacitance across resistor 34 now discharges through resistor 34, and the voltage at point B reduces until it reaches the switching threshold for inverter 36. At this point, transistor $P_2$ goes off and transistor $N_2$ goes on. When transistor $N_2$ goes on, capacitor 42 discharges toward $V_{SS} = -1.5$ volts. As soon as point C reduces in value sufficiently so that it is equal to the NOR gate threshold voltage, NOR gate 40 again becomes enabled, and D goes high. D remains high until A terminates. The duration of the pulse D is equal to that of pulse E, and pulse E turns on transistor $Q_1$.

The "first case" illustrated in FIG. 4 is one in which $V_{EE}$ is close to $-6$ volts. The "second case" illustrated in FIG. 4 is one in which $V_{EE}$ is substantially less than $-6$ volts. In this second case, the overshoot of wave B is to some level, $-Y$ volts, which is more positive than the $-X$ volts of the first case. Moreover, in this second case, the wave B charges toward a final level, $-Y_S$, which is more positive than the final level $-X_S$ of the wave B in the first case. Thus, wave B in the second case reaches the switching threshold for inverter 36 prior to the time that it does this in the first case. The result, as can be seen from FIG. 4, is that the pulse D is of greater duration in the second case than in the first case. This, in turn, means the transistor $Q_w$ is turned on for a longer period in the second case than in the first case, just as desired.

In the anomalous mode of operation just described, the lagging edge of the wave D is fixed in time, and the leading edge occurs at a time dependent on the value of $V_{EE}$. This can be referred to as "leading edge modulation" of the wave D. In the operation depicted in FIG. 3, the leading edge of wave D is fixed in time, and the position of the lagging edge is a function of the value of $V_{EE}$. This can be thought of as "lagging edge modulation" of the wave D.

In the anomalous mode of operation, the width of the pulse D depends upon the discharge of capacitor 42 through MOS transistor $N_2$. In the mode of operation depicted in FIG. 3, the width of pulse D depends upon the charging time constant of capacitor 42 through MOS transistor $P_2$.

Figure 5:
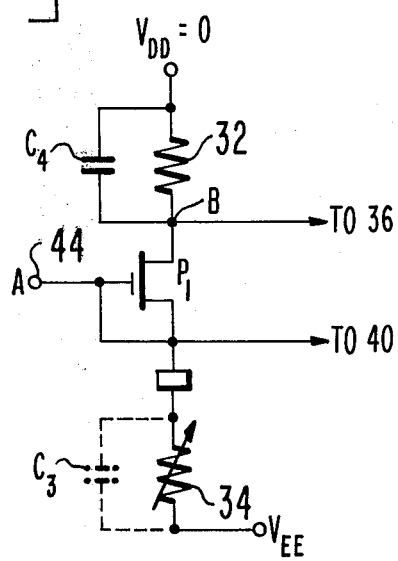
FIG. 5 is a drawing of a portion of the circuit of FIG. 2 modified to avoid the anomalous mode of operation.

FIG. 5 shows a slight modification of the circuit of FIG. 2 to prevent the anomalous mode of operation just described. The distributed capacitance across resistor 34 is illustrated in phantom at $C_3$. Its value in one design was estimated to be of the order of 2 picofarads or so. The circuit modification is to place an integrated circuit capacitance $C_4$ across resistor 32. This capacitance preferably should have a value somewhat greater than that of capacitor $C_3$, and in one particular design is in the range of 3 to 8 picofarads. This capacitor may be fabricated in a number of ways, and in one it was designed to be the distributed capacitance of an MOS capacitor over the length of resistor 32. Other alternatives such as a lumped integrated circuit capacitor are possible.

In the operation of the circuit of FIG. 2, modified as shown in FIG. 5, the capacitances $C_4$ and $C_3$ can be considered to act somewhat like a capacitive voltage divider. Capacitor $C_4$ balances the tendency for the capacitor $C_3$ to cause the voltage at point B to overshoot. The operation with the circuit modified as shown in FIG. 5 is the same as depicted in FIG. 3, and as already discussed.

In the various embodiments of the invention discussed above capacitor 42 is connected at one terminal to $V_{SS}$. It can instead be connected to $V_{DD}$. Other circuit modifications also are possible without departing from the spirit of the invention.

What is claimed is:

1. In combination:
   a charge supply circuit;
   means responsive to a control signal which recurs at a fixed frequency for supplying energy to said charge supply circuit during spaced time intervals which recur at said fixed frequency, said control signal having a time duration which is only a small fraction of the recurrence period of said control signal;
   a charge storage circuit for producing an output voltage proportional to the charge stored therein connected to said charge supply circuit for receiving charge therefrom upon the termination of each said spaced time interval;
   means coupled to said charge storage circuit and responsive to said control signal for sampling said output voltage across said charge storage circuit only for an interval during each recurrence period of said control signal which is not greater than the duration of said control signal; and
   means responsive to the sampled voltage for adjusting the duration of each said spaced time interval to a value not substantially greater than that required to permit the replacement of the charge lost by said charge storage circuit since the preceding sampling period.

2. In the combination as set forth in claim 1, said charge supply circuit comprising an inductor.

3. In the combination as set forth in claim 2, said means for supplying energy to said charge supply circuit comprising:
   terminals between which an operating voltage may be applied;
   a switch in series with said inductor, said series circuit connected between said terminals; and
   means for closing said switch during said spaced time intervals.

4. In the combination as set forth in claim 3, said switch comprising a transistor having base, emitter and collector electrodes, the collector electrode-to-emitter electrode path of said switch being connected in series with said inductor, and said means responsive to the sampled voltage comprising means for applying a pulse in the forward direction to the base-emitter junction of said transistor of a duration proportional to said sampled voltage.

5. In the combination as set forth in claim 1, said means responsive to the sampled voltage comprising:
   a two input logic gate the first of the inputs initially being at a voltage level representing one binary value and the second input initially being at a voltage level representing the other binary value;
   means for placing said second input at a voltage representing said one binary value during each sampling period; and
   means responsive to the sampled voltage for changing the value of the voltage at said first of said inputs toward the voltage representing said other binary value at a rate proportional to the value of the sampled voltage.

6. In the combination as set forth in claim 1, said means for sampling the voltage across said charge storage circuit comprising a series circuit which includes a normally open switch responsive to said control signal connected in series with a voltage divider, said series circuit connected across said charge storage circuit, and an output terminal connected to a point along said voltage divider, whereby each time a control signal occurs said switch is closed and a voltage proportional to the voltage across said charge storage circuit appears at said output terminal.

7. In the combination as set forth in claim 1, said voltage divider comprising two resistive means, one of substantially larger value that the other, and said larger resistive means exhibiting a distributed capacitance, and further including capacitive means of larger value than said distributed capacitance, said capacitive means being connected across the resistive means of lower value.

8. In the combination as set forth in claim 6, said series circuit comprising a first adjustable resistor of relatively large value, a second resistor only a fraction of the value of said first resistor and a MOS transistor serving as said switch, said MOS transistor having a conduction path and said conduction path serving as the connection between said two resistors, said MOS transistor having a gate electrode to which said control signal is applied.

9. In the combination as set forth in claim 8, said means for sampling further including a COS/MOS inverter comprising two MOS transistors of opposite conductivity types the conduction paths of which are connected in series between the end of said voltage divider at which the resistor of lower value is located and a terminal for an operating voltage of the same polarity as the voltage across charge storage circuit, the gate electrodes of said inverter MOS transistors being connected in common to the output terminal of said voltage divider and the conduction path impedance of the inverter MOS transistor connected to said end of said voltage divider being substantially lower, when conducting, than the conduction path impedance of the other inverter MOS transistor, when conducting.

10. In a circuit which includes a voltage converter having a switch and inductor interconnected so that when the switch is closed, current passes through the inductor, and which also includes a capacitor in circuit with the inductor which is charged by the inductor when the switch opens and which also includes means for closing the switch at spaced time intervals, in combination:

means, each time said switch is closed, for sampling the voltage across the capacitor for a period which is relatively very short compared to the intervals between sampling periods said means comprising a voltage divider in series with a second switch, said series circuit connected across said capacitor, and means for closing said second switch concurrently with the closing of the first mentioned switch;

means responsive to the sampled voltage for producing a ramp voltage having a slope proportional to the amplitude of the sampled voltage; and means for opening the first mentioned switch when said ramp voltage reaches a predetermined threshold value.

11. In combination:

two terminals between which an operating voltage may be applied;

a transistor having base, emitter and collector electrodes;

an inductor connected in series with the emitter-to-collector path of said transistor between said terminals;

a diode connected at one electrode to said collector electrode;

a capacitor connected between the other electrode of said diode and said emitter electrode, whereby each time a turn-on pulse is applied to said base electrode, in the forward direction, current flows through said inductor and when the pulse terminates, said inductor charges said capacitor through said diode;

means responsive to a recurrent control pulse which has a time duration which is only a small fraction, less than one tenth, of the recurrence period of said control pulse for sampling the voltage across said capacitor each time a turn on pulse is applied to said base electrode and only for a period not greater than the time duration of said control pulse;

means responsive to the sampled voltage for producing a signal of a duration inversely proportional to the amplitude of said voltage; and means responsive to said signal for producing said turn on pulse and applying it to said base electrode.

* * * * *